United States Patent
Shiraishi et al.

(10) Patent No.: US 6,526,436 B1
(45) Date of Patent: Feb. 25, 2003

(54) ELECTRONIC MAIL COMMUNICATION APPARATUS AND ELECTRONIC MAIL TRANSMISSION METHOD

(75) Inventors: Naoki Shiraishi, Yamatokoriyama (JP); Kouichi Harada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/320,662

(22) Filed: May 27, 1999

(30) Foreign Application Priority Data

Jun. 1, 1998 (JP) .......................................... 10-151015

(51) Int. Cl.[7] .............................................. G06F 15/16
(52) U.S. Cl. ........................................ 709/206; 709/245
(58) Field of Search ........................ 379/100.08, 93.24; 709/245, 206

(56) References Cited

U.S. PATENT DOCUMENTS 5,493,692 A  *  2/1996  Theimer et al. ........... 340/5.74
5,533,026 A  *  7/1996  Ahmadi et al. ............. 370/338
5,706,434 A  *  1/1998  Kremen et al. ................ 707/10
6,115,754 A  *  9/2000  Landgren ..................... 709/236

FOREIGN PATENT DOCUMENTS

JP          4212550       8/1992

* cited by examiner

Primary Examiner—Kenneth R. Coulter
Assistant Examiner—Hai V. Nguyen
(74) Attorney, Agent, or Firm—Birch, Stewart, Kolasch & Birch, LLP (57) ABSTRACT

In an electronic mail communication apparatus and in an electronic mail transmission method, to a signature entered through a data entry means 2 and stored in a RAM 7, information on the current location found by a current location finder and stored in the RAM 7, characters such as "in", and a CR code are added. A text of electronic mail is transmitted with this signature appended thereto.

10 Claims, 6 Drawing Sheets

| | |
|---|---|
| The meeting today, at witch you are expected to be present, will start at 3:00 pm as set previously. | TRANSFERRED FROM E-MAIL TEXT STORAGE SECTION |
| In Umeda X-chome, Kita-ku Osaka City, | TRANSFERRED FROM CURRENT LOCATION STORAGE SECTION |
| XXX Corporation, XXX Division, Taro Yamada | TRANSFERRED FROM SIGNATURE STORAGE SECTION |

The meeting today, at witch you are expected to be present, will start at 3:00 pm as set previously.

In Umeda X-chome, Kita-ku, Osaka City,
XXX Corporation, XXX Division,

Taro Yamada

FIG. 7

I'll arrive at Tokyo Station at 13:30 today.
I'll be waiting for you to pick me up at the station.

On the way to XXX X-chome, Nagoya City,
Aichi Prefecture,
XXX Trading Company,
  Hanako Tanaka

ELECTRONIC MAIL COMMUNICATION APPARATUS AND ELECTRONIC MAIL TRANSMISSION METHOD

BACKGROUND OF THE INVENTION

1. Field of the Invention

The present invention relates to an electronic mail communication apparatus and an electronic mail transmission method that automatically append a signature to outgoing electronic mail.

2. Description of the Prior Art

In recent years, electronic mail (hereafter also e-mail) has been coming into wider and wider use. When e-mail is transmitted, it is customary to append thereto a "signature" including personal information such as the sender's corporate post and contact address. Moreover, it is becoming increasingly common to use more than one signature to use different signatures, for example, between overseas and domestic e-mail.

For example, Japanese Laid-Open Patent Application No. H4-212550 discloses a technique of appending to a text of e-mail a signature selected from among a plurality of signatures previously stored in a memory or the signature recorded in e-mail transmission history as having been used for the same addressee in the past.

However, for the addressee to be able to know from where and in what situation the sender sent the e-mail, it is essential to use a signature that includes information as to the location from which the sender sent the e-mail.

Previously creating and storing a plurality of signatures including information as to different locations is helpful in cases where the sender is likely to send e-mail from one of a comparatively limited number of locations. However, with a mobile communication apparatus that allows transmission/reception of e-mail anywhere by the use of a portable communications terminal or public telephone, it is impossible to specifically identify the location from which e-mail is transmitted, and therefore it is difficult to previously create and store a signature for such a location.

It is of course possible to note within a text of e-mail the location and the situation from and in which the sender sends e-mail. This, however, needs to be done every time e-mail is transmitted, and thus is very troublesome.

SUMMARY OF THE INVENTION

An object of the present invention is to provide an electronic mail communication apparatus and an electronic mail transmission method that allow information as to from where a sender sent e-mail and whether the sender is currently moving or not to be automatically added to a signature so that such information is made readily known to an addressee.

To achieve the above object, according to one aspect of the present invention, an electronic mail communication apparatus is provided with:

a signature memory for storing for later output a signature including personal information as to a sender;

a current location finder for finding the current location of the sender;

a current location adder for adding the current location found by the current location finder to the signature stored in the signature memory; and a transmitter for transmitting a text of electronic mail after appending thereto the signature including the current location added thereto by the current location adder.

In this electronic mail communication apparatus, the current location finder recognizes the current location of the sender of electronic mail. The current location adder adds the recognized current location to the signature of the sender stored in the signature memory. The transmitter transmits this signature, having the current location appended thereto, together with a text of electronic mail.

The electronic mail communication apparatus may be further provided with a movement detector. In that case, when the movement detector recognizes that the electronic mail communication apparatus is moving, information indicating that the sender is moving is added to the signature.

According to another aspect of the present invention, a method for transmitting electronic mail is provided with:

a signature memory for storing for later output a signature including personal information as to a sender;

a current location finder for finding the current location of the sender;

a current location adder for adding the current location found by the current location finder to the signature stored in the signature memory; and a transmitter for transmitting a text of electronic mail after appending thereto the signature including the current location added thereto by the current location adder.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
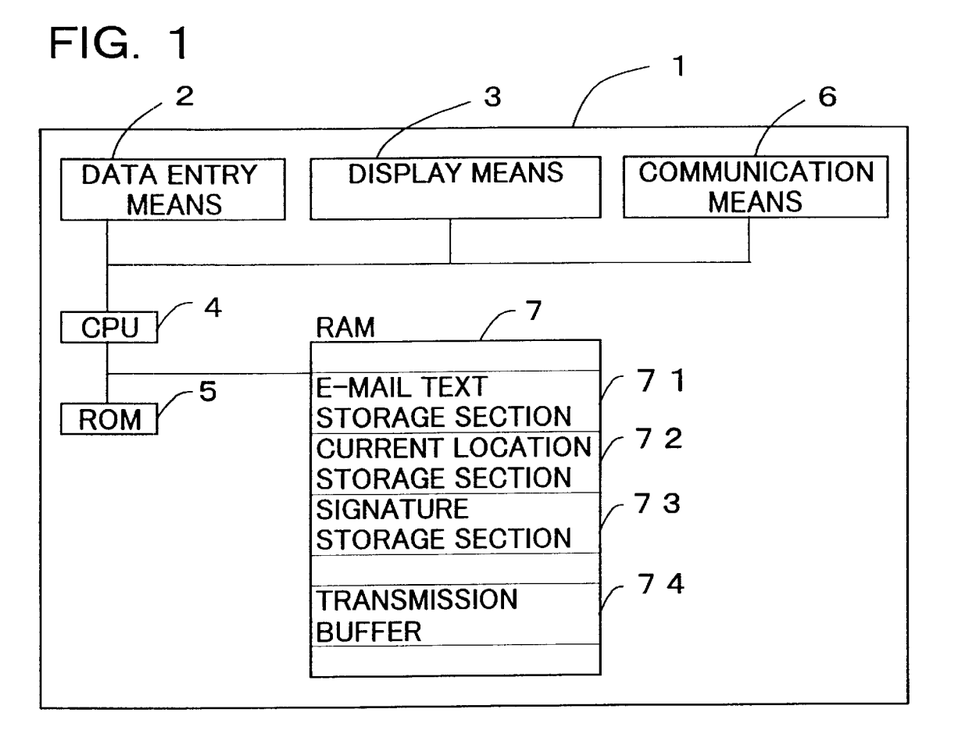
FIG. 1 is a block diagram showing the configuration of the electronic mail communication apparatus of a first embodiment of the invention.

Hereinafter, embodiments of the present invention will be described in detail with reference to the accompanying drawings. FIG. 1 is a block diagram showing the configuration of the electronic mail communication apparatus of a first embodiment of the invention.

The electronic mail communication apparatus 1 is composed of a data entry means 2 such as a keyboard for entering a signature to be stored, a message to be transmitted, and the like; a display means 3 such as an LCD (liquid crystal display); a ROM 5 for storing a program and the like for controlling the electronic mail communication apparatus 1; a CPU 4 for controlling the electronic mail communication apparatus 1 in accordance with the program stored in the ROM 5; a communication means 6 for receiving information as to the location of the relay station with which the electronic mail communication apparatus 1 is currently communicating and for transmitting/receiving e-mail; and a RAM 7.

Within the RAM 7 are secured, in addition to a working area used to run the electronic mail communication apparatus 1, an e-mail text storage section 71 for storing a text of e-mail that the sender is going to transmit, a current location storage section 72 for storing the information as to the current location received by the communication means 6, a signature storage section 73 for storing a signature that is registered by the sender so as to be appended to e-mail, and a transmission buffer 74 for storing temporarily the data to be transmitted from the communication means 6.

Figure 2:
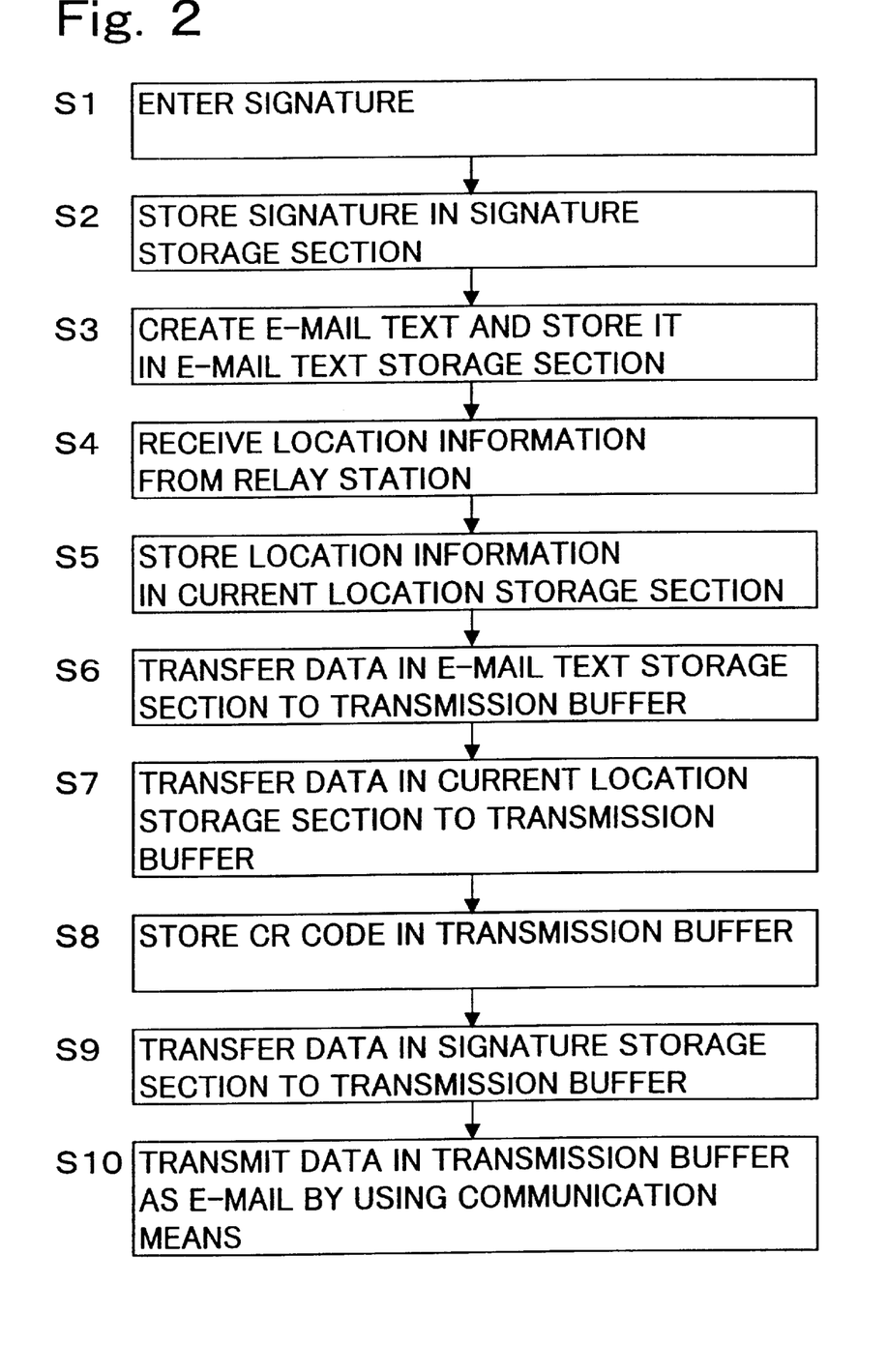
FIG. 2 is a flow chart showing the operation of the electronic mail communication apparatus of the first embodiment.

FIG. 2 is a flow chart showing the operation of the electronic mail communication apparatus 1. The sender enters, by using the data entry means 2 such as a keyboard, a signature, like "XXX Corporation, XXX Division, Taro Yamada", including personal information such as the sender's address, name, corporate name, corporate post, contact address, and the like (step Si). It is also possible to store the signature in an external storage device and call it when required.

Figure 3A:
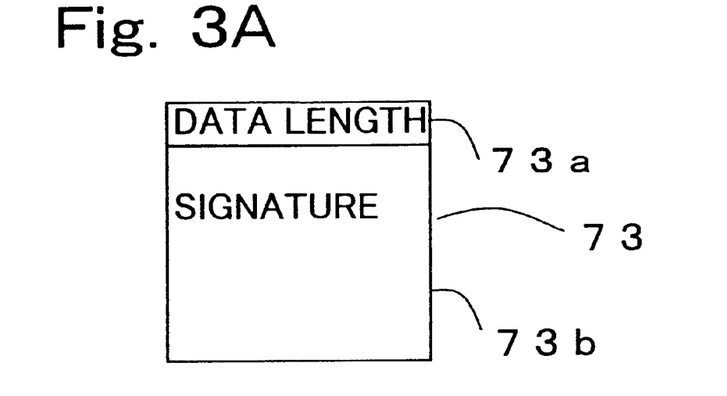
FIG. 3A is a diagram showing how data is stored in the e-mail text storage section in the electronic mail communication apparatus of the first embodiment.

The signature thus entered is stored in the signature storage section (serving as a signature memory) 73 secured within the RAM 7 (step S2). As shown in FIG. 3A, the data length of the entered signature is stored in a one-byte fixed-length area 73a secured at the head of the signature storage section 73. The fixed-length area 73a is followed by a data area 73b, in which the data of the signature is stored. Storing the data length in the fixed-length area 73a makes it possible to recognize the end position of the data of the entered signature.

Once the data of a signature is stored in the signature storage section 73, the signature stored in the data area 73b is automatically appended to a text of e-mail until the sender registers a new signature or cancels the appending of the signature.

Figure 3B:
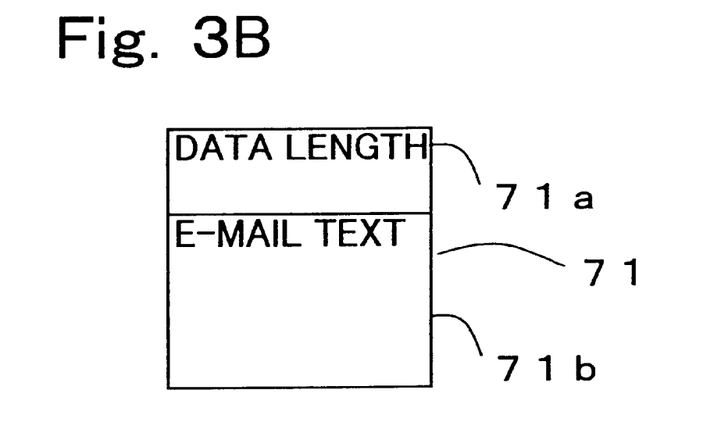
FIG. 3B is a diagram showing how data is stored in the current location storage section in the electronic mail communication apparatus of the first embodiment.

Next, the sender, using the data entry means 2 as in step S1, creates and enters a text of e-mail to be transmitted. The e-mail text thus created is stored in the e-mail text storage section 71 secured within the RAM 7 (step S3). As shown in FIG. 3B, as in the signature storage section 73, the data length of the entered e-mail text is stored in a two-byte fixed-length area 71a secured at the head of the e-mail text storage section 71. The fixed-length area 71a is followed by a data area 71b, in which the data of the e-mail text is stored.

Next, while the e-mail text is being created, the communication means 6, which serves as a current location finder, receives information as to the location of a relay station of a PHS (Personal Handyphone System) or mobile-telephone network so as to recognize the current location of the sender (step S4). Specifically, information as to the location of a relay station, like "Umeda X-chome, Kita-ku, Osaka City", is received by the communication means 6 so as to recognize the current location of the sender. The smaller the individual cells of the cellular-telephone network used, as in a PHS network, the more accurately the current location can be determined.

Figure 3C:
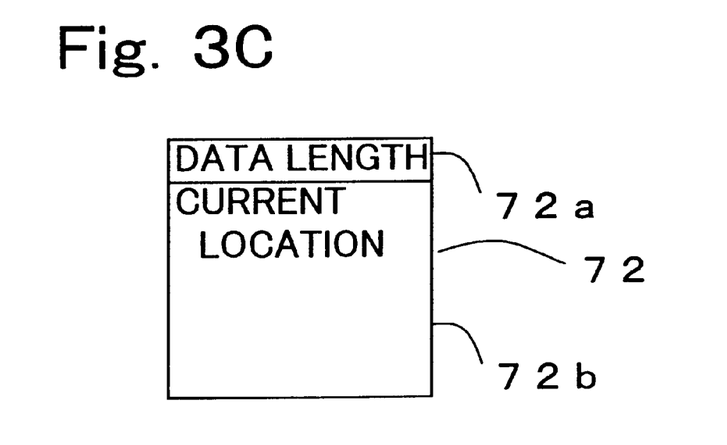
FIG. 3C is a diagram showing how data is stored in the signature storage section in the electronic mail communication apparatus of the first embodiment.

The data of the current location thus recognized is stored in the current location storage section 72 secured in the RAM 7 (step S5). As shown in FIG. 3C, as in the signature storage section 73, the data length of the data of the recognized current location is stored in a one-byte fixed-length area 72a secured at the head of the current location storage section 72. The fixed-length area 72a is followed by a data area 72b, in which the data of the current location is stored.

When the sender, by performing entry operation, as by operating the keys of the data entry means 2, requests transmission of e-mail, the data stored in the e-mail text storage section 71 secured in the RAM 7 is transferred to the transmission buffer 74 secured in the RAM 7 (step S6). At this time, the data representing the data length stored in the fixed-length area 71a at the head of the e-mail text storage section 71 is not transferred to the transmission buffer 74; that is, only the data stored in the data area 71b is transferred thereto.

Next, a word or phrase like "in" followed by the data stored in the current location storage section 72 is transferred to the transmission buffer 74 (step S7). In the same manner as described above, the data representing the data length stored in the fixed-length area 72a at the head of the current location storage section 72 is not transferred to the transmission buffer 74, but only the data representing the current location is transferred thereto. Then, a CR code, representing a carriage return, is transferred to the transmission buffer 74 (step S8). Through steps S7 and S8, the current location of the sender, like "in Umeda X-chome, Kita-ku, Osaka City", is added to the signature. Thus, the CPU 4 serves as a current location adder.

Figure 4:
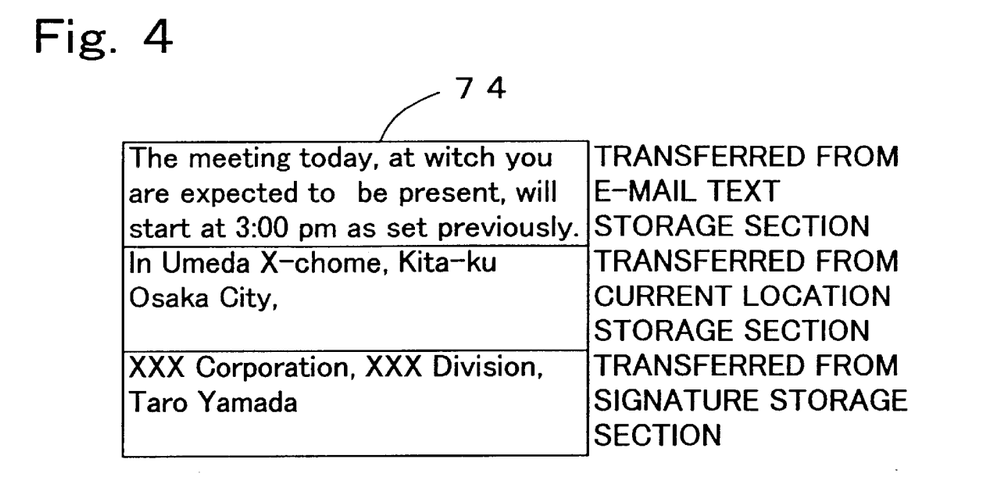
FIG. 4 is a diagram showing an example of data stored in the transmission buffer of the electronic mail communication apparatus of the first embodiment.

Next, the data stored in the signature storage section 73 is transferred to the transmission buffer 74 (step S9). In the same manner as described above, the data representing the data length stored in the fixed-length area 73a at the head of the signature storage section 73 is not transferred to the transmission buffer 74, but only the data representing the signature is transferred thereto. Now, all the data to be transmitted is stored in the transmission buffer 74 as shown in FIG. 4.

Then, the data stored in the transmission buffer 74 is transmitted by the communication means 6, which serves as a transmitter (step S10). The length of the data thus transmitted can be determined by adding together the data lengths stored in the fixed-length areas 71a, 72a, and 73a of the e-mail text storage section 71, the current location storage section 72, and the signature storage section 73, and the data lengths of the word "in" and the CR code stored in the transmission buffer 74 in steps S7 and S8.

Figure 5:
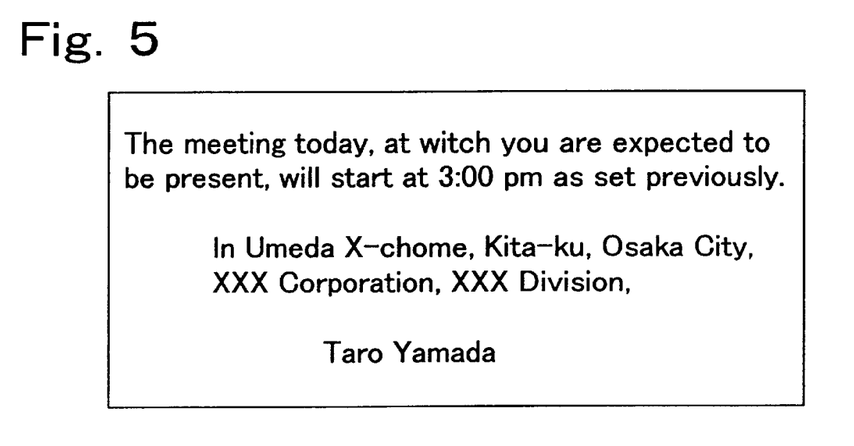
FIG. 5 is a diagram showing an example of e-mail with a signature having information as to the current location added thereto.

FIG. 5 shows an example of e-mail transmitted in this way. In FIG. 5, "XXX Corporation, XXX Division, Taro Yamada" is the signature that the sender has previously stored in the signature storage section 73, and "Umeda X-chome, Kita-ku, Osaka City" is the current location added to the signature.

In the embodiment under discussion, a means is provided that recognizes the current location of the sender and transmits an e-mail text with a signature having the recognized current location added thereto. Thus, the sender can easily incorporate the information as to where an e-mail text was created into the signature without consciously noting the location in the signature. This makes it possible for the addressee to know without fail from where the sender sent e-mail.

Figure 6:
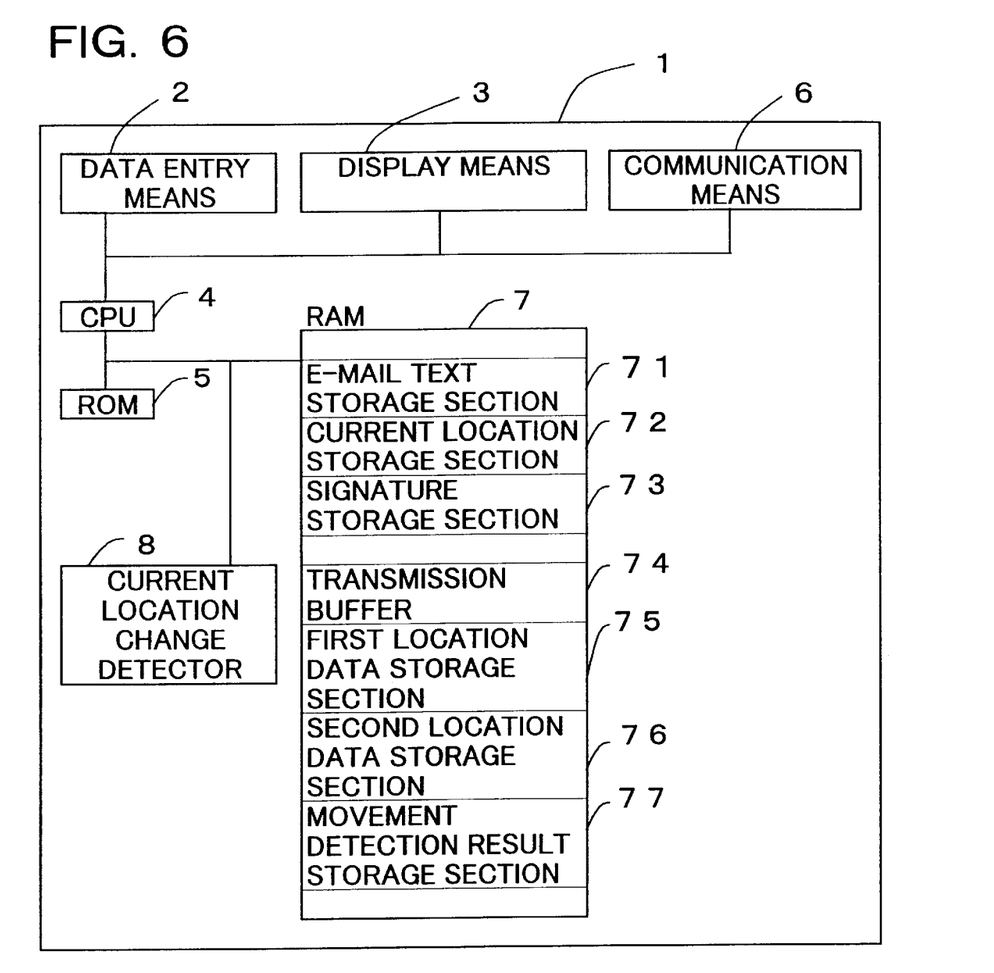
FIG. 6 is a block diagram showing the configuration of the electronic mail communication apparatus of a second embodiment of the invention.

FIG. 6 is a block diagram showing the configuration of the electronic mail communication apparatus of a second embodiment of the invention. Note that, in FIG. 6, for simplicity's sake, such elements as are found also in the first embodiment shown in FIG. 1 are identified with the same reference numerals. The second embodiment is different from the first embodiment in that a first location- data storage section 75, a second location data storage section 76, and a movement detection result storage section 77 are additionally secured in the RAM 7, and in that a current location change detector (serving as a movement detector) is additionally provided. Thus, the data entry means 2, the display means 3, the communication means 6, as well as the e-mail text storage section 71, the current location storage section 72, and the signature storage section 73 secured in the RAM 7, have the same configuration as in FIG. 1.

The first and second location data storage sections 75 and 76 are used to store the information as to the current location as received by the communication means 6 at different time points, for example at the time point when an e-mail text starts being created and at the time point when keys are operated to transmit the e-mail text, respectively. When the current location is stored in the second location data storage section 76, the same current location data is stored also in the current location storage section 72.

The current location change detector 8 compares the data stored in the first location data storage section 75 with the data stored in the second location data storage section 76 in terms of data length and data contents. If the two sets of data coincide, the movement detection result storage section 77 is reset, and, if not, a flag is set in the movement detection result storage section 77.

As compared with the flow chart shown in FIG. 2 and described earlier in connection with the first embodiment, the operation of the electronic mail communication apparatus of this embodiment is different in the following point. Specifically, when an e-mail text is transmitted in step S7, if a flag is set in the movement detection result storage section 77, instead of storing a word or phrase like "in" in the transmission buffer 74, an expression such as "on the way to" is stored in the transmission buffer 74 to indicate that the sender is moving. Thus, it is possible to add to the signature the current location and situation of the sender, like "on the way to XXX X-chome, Nagoya City, Aichi Prefecture".

Figure 7:
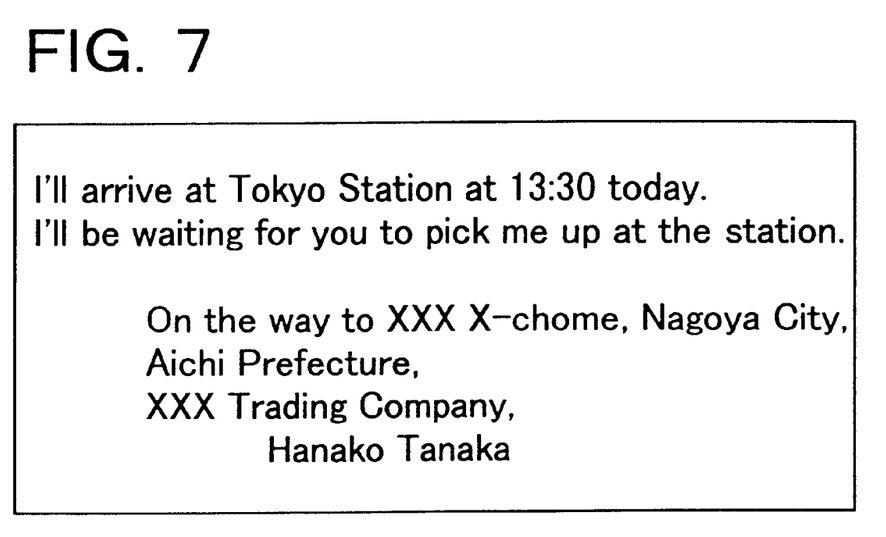
FIG. 7 is a diagram showing an example of e-mail having a message indicating movement of the sender added thereto.

FIG. 7 shows an example of e-mail transmitted by the use of the electronic mail communication apparatus of this embodiment. In FIG. 7, "XXX Trading Company, Hanako Tanaka" is the signature that the sender has previously stored in the signature storage section 73, and "XXX X-chome, Nagoya City, Aichi Prefecture" added thereto is the current location as recognized by the current location finder.

Moreover, "on the way to" is the phrase that is stored in the transmission buffer 74 as a result of the movement detector 8 detecting the movement of the sender. This makes it possible for the addressee to know that the sender sent e-mail while traveling by car or train in "XXX X-chome, Nagoya City, Aichi Prefecture".

In this embodiment, the movement detector is realized by recognizing the current location a plurality of times, for example when an e-mail text starts being crated and when the e-mail text is finished, and checking whether there has been any change in the current location or not. However, it is also possible to use an acceleration sensor to check whether the electronic mail communication apparatus is moving or not.

In both the first and second embodiments, the current location finder uses, as a means for recognizing the current location, a terminal for a PHS or mobile-telephone network or the like so as to use the information as to the location of a relay station as received from the relay station itself. However, it is also possible to recognize the current location of the sender by the use of a GPS (global positioning system). In that case, from the data received from a GPS, the latitude and longitude are determined by calculation as representing the current location.

The calculated latitude and longitude are stored in the current location storage section 72 mentioned earlier, or alternatively the address of the current location as determined from the latitude and longitude is stored in the current location storage section 72. To determine the address of the current location from the latitude and longitude, first the data of the latitude and longitude is sent to a communication center, which then retrieves the address corresponding to the latitude and longitude and sends the address back to the electronic mail communication apparatus.

What is claimed is:

1. A portable electronic mail communication apparatus comprising:

a memory for storing for later output a signature including personal information as to a sender;

a current location finder for finding a current location of the sender;

a current location adder for adding the current location found by the current location finder to the signature stored in the memory; and a transmitter for transmitting a text of electronic mail from the portable electronic mail communication apparatus after automatically appending thereto the signature including the current location added thereto by the current location adder.

2. The portable electronic mail communication apparatus as claimed in claim 1, further comprising:

a movement detector for checking whether the electronic mail communication apparatus is moving or not, wherein, when the movement detector recognizes that the electronic mail communication apparatus is moving, information indicating that the sender is moving is added to the signature.

3. The portable electronic mail communication apparatus as claimed in claim 1, wherein the memory includes:

an electronic mail storage section for storing the text of electronic mail entered by the data entry means, a current location storage section for storing information as to the current location received from the location finder, a signature storage section for storing a signature that is entered by the data entry means, and a transmission buffer for temporarily storing the data to be transmitted from the communication apparatus.

4. The portable electronic mail communication apparatus as claimed in claim 1, wherein the signature stored is automatically appended to the text of electronic mail until a sender registers a new signature or cancels the appending of the signature.

5. The portable electronic mail communication apparatus as claimed in claim 1, wherein while the text of electronic mail is being created by the data entry means, the current location finder receives information as to the location of a relay station so as to recognize the current location of the sender.

6. The portable electronic mail communication apparatus as claimed in claim 2, wherein the memory includes:

an electronic mail storage section for storing the text of electronic mail entered by the data entry means, a current location storage section for storing information as to the current location received from the location finder, a signature storage section for storing a signature that is entered by the data entry means, a first location data storage section, a second location data storage section, a movement detection result section for storing the results obtained from the movement detector, and a transmission buffer for temporarily storing the data to be transmitted from the communication apparatus, wherein the first and second location data storage sections are used to store the information as to the current location as received by the current location finder at different time points, respectively.

7. The portable electronic mail communication apparatus as claimed in claim 6, wherein if the movement detector detects movement of the sender, a phrase indicating that the sender is moving followed by the data stored in the current location storage section is transferred to the transmission buffer.

8. The portable electronic mail communication apparatus as claimed in claim 3, wherein a preposition followed by the data stored in the current location storage section is transferred to the transmission buffer.

9. A method for transmitting electronic mail via a portable communication apparatus, comprising:

storing for later output a signature including personal information as to a sender;

finding a current location of the sender;

adding the current location found to the signature stored; and transmitting a text of electronic mail from the portable electronic mail communication apparatus after automatically appending thereto the signature including the current location added thereto.

10. The method for transmitting electronic mail via a portable communication apparatus as claimed in claim 9, further comprising:

checking whether a communication apparatus is moving or not, wherein, when the communication apparatus is moving, adding information indicating that the sender is moving to the signature.

\* \* \* \* \*